UNITED STATES PATENT OFFICE 2,299,742

PROCESS FOR PREPARING PHOSGENE OXIME

Philip J. Ehman and Walter O. Walker, Marinette, Wis., assignors to Ansul Chemical Company, Marinette, Wis., a corporation of Wisconsin No Drawing. Application November 24, 1941, Serial No. 420,309

20 Claims. (Cl. 260—566)

This invention relates to a process for the preparation of phosgene oxime. More specifically the invention relates to a process for the preparation of phosgene oxime by chlorinating an aqueous solution of chloroisonitrosoacetone.

When chloroisonitrosoacetone, $$CH_3COClCl:NOH$$

prepared by any known method, preferably from acetone and aqua regia, is dissolved in water and treated with chlorine gas, the products of the reaction are HCl, acetic acid and phosgene oxime ($Cl_2C:NOH$). The reaction very likely occurs in the following two steps:

1. $Cl_2 + H_2O \rightarrow HOCl + HCl$
2. $CH_3COCCl:NOH + HOCl \rightarrow$
$$CH_3COOH + Cl_2C:NOH$$

The resulting water solution will contain phosgene oxime, HCl, acetic acid and unreacted chloroisonitrosoacetone. By means of a distillation, preferably at reduced pressure, the phosgene oxime, HCl, acetic acid and water can be separated from the chloroisonitrosoacetone and the distillate can then be extracted with a suitable organic solvent such as diethyl ether, diisopropyl ether or benzene to separate the phosgene oxime, or it can be heated to boiling for about two to three hours to produce a water solution of pure hydroxylamine hydrochloride. In our copending application Serial No. 420,308, filed on the same date as this application, the procedure of preparing hydroxylamine hydrochloride involving the hydrolysis of phosgene oxime, is described. In addition to the products just mentioned, chloropicrin is produced in small amounts as a by-product of the reaction and can be separated mechanically from the distillate after vacuum distillation.

An important feature of this invention resides in the discovery that when one part by weight of chloroisonitrosoacetone is added to from one to twenty parts by weight of water, preferably to about six parts, and then treated with from one-fourth to one part by weight of chlorine gas, preferably with about one-half part, by any convenient method of gas dispersion, at a reaction temperature of 10° C. to 50° C., preferably at 10° C. to 20° C., a solution of phosgene oxime will be produced which can be separated from unreacted chloroisonitrosoacetone by distillation, preferably at reduced pressure, and the phosgene oxime contained in the distillate can be separated by extraction with a suitable solvent such as diethyl ether, diisopropyl ether or benzene.

Example No. 1

Add 140 gms. (1.15 moles) of chloroisonitrosoacetone to about 800 cc. of water in a 2 liter flask equipped with a chlorine inlet, a thermometer and a manometer. After flushing all the air out of the flask with chlorine gas, stopper the flask and shake for 6 hours. Keep the chlorine pressure at slightly above atmospheric and the temperature between 10° C. and 20° C. During this time about 70 gms. of chlorine will be absorbed. Now distill off, at reduced pressure, about 90% of the chlorinated solution. The residue will consist of unreacted chloroisonitrosoacetone (about 40 gms.) partially in solution in 23% hydrochloric acid. This chloroisonitrosoacetone can be separated by cooling to about 10° C. and filtering and can be added to the next run. The filtrate can be discarded. The distillate which contains all the phosgene oxime is placed in a liter separatory funnel and, after removing the crude chloropicrin, is extracted about four times with 50 cc. portions of diethyl ether, diisopropyl ether or benzene. The combined extracts are dried over $CaCl_2$, the solvent removed by distillation at atmospheric pressure and the residue fractionated at reduced pressure. The fraction obtained at about 60° to 65° C. at 40 mm. pressure will consist of about 75 to 85 gms. (about 55% to 65% yield) of 95% (impurities are acetic acid, extraction solvent and chloropicrin) phosgene oxime. The lower fractions containing considerable phosgene oxime are added to the distillate at the next extraction and the residue, which is quite small, is discarded. The main phosgene oxime fraction is further purified by additional fractionation.

Example No. 2

When acetone is reacted with aqua regia, say by treating 50 gms. of acetone with 200 gms. concentrated nitric acid and 300 gms. of concentrated HCl, the resulting solution will contain chloroisonitrosoacetone. There is also present such a high concentration of hydrochloric acid that when an attempt is made to convert the chloroisonitrosoacetone to phosgene oxime by treating with chlorine gas the reaction is too slow, because the hydrochloric acid acts as a chlorinating inhibitor. In order to overcome this difficulty, we have developed a method whereby the reaction product contains a low concentration of hydrochloric acid such that after dilution to the required amount (one part of chloroisonitrosoacetone in six parts of water), the chlorination will proceed at about the same rate as when starting with chloroisonitrosoacetone and water. The following is an example of a typical procedure:

Add 100 gms. of acetone, in about one hour, to a well stirred mixture of 200 gms. of concentrated (sp. gr. 1.42) nitric acid and 150 gms. of concentrated (sp. gr. 1.18) hydrochloric acid at a reaction temperature starting at 35° C. and gradually allowed to rise to about 70° C. Allow to stand for about 10 minutes at 70° C., then add about 600 cc. of water and cool to about 20° C. This mixture is then equivalent to the addition of about 140 gms. of chloroisonitrosoacetone to 800 cc. of water and the results are about the same. (See Example No. 1.)

My means of this procedure the separation of chloroisonitrosoacetone becomes unnecessary, which in practice would require cooling and filtering the reaction product and almost complete evaporation of the filtrate to recover dissolved chloroisonitrosoacetone. In addition our procedure almost doubled the yield of chloroisonitrosoacetone on the basis of the most expensive starting material, nitric acid.

One of the advantages of our invention is the economical production of phosgene oxime which in turn can be used for the production of hydroxylamine hydrochloride. It has been found that if the phosgene oxime solution (just prior to extraction) is boiled under reflux for two to three hours and the solution evaporated at reduced pressure a good yield of exceptionally pure hydroxylamine hydrochloride will be obtained.

*Example No. 3*

When the product of the action of 100 gms. of acetone on a mixture of 200 gms. of concentrated (sp. gr. 1.42) nitric acid and 150 gms. of concentrated (sp. gr. 1.18) hydrochloric acid is diluted with about 600 cc. of water, or when 140 gms. of chloroisonitrosoacetone is added to 800 cc. of water, and either mixture chlorinated for 6 hours at 10° C. to 20° C. and then vacuum distilled to the extent of about 90% there will be produced a solution of phosgene oxime which when heated to boiling for two to three hours and then evaporated to dryness at reduced pressure, will yield about 50 gms. of pure (at least 99%) hydroxylamine hydrochloride.

A by-product of the action of chlorine on chloroisonitrosoacetone solutions is a crude chloropicrin, the recovery and purification of which, although not being essential to the production of either phosgene oxime or hydroxylamine hydrochloride is important economically. The crude chloropicrin can be separated mechanically from the distillate obtained after vacuum distillation of a chlorinated chloroisonitrosoacetone solution. It will contain some phosgene oxime so it should be washed once with water. It should then be washed with cold lime sludge until a red color or heat evolution is no longer produced. It should then be steam distilled. The yield of pure chloropicrin is about 20 gms. for each 200 gms. of nitric acid.

It is to be understood that the examples given are illustrative embodiments of our invention and that the procedure for carrying out the invention may be considerably modified within the controlled conditions disclosed which are intended to be included in the appended claims.

We claim:

1. A process for preparing phosgene oxime which comprises reacting an aqueous solution of chloroisonitrosoacetone with chlorine, distilling the resulting solution, and extracting the phosgene oxime from the distillate by means of a suitable solvent.

2. A process for preparing phosgene oxime which comprises reacting an aqueous solution of chloroisonitrosoacetone with chlorine, distilling the resulting solution, and extracting the phosgene oxime from the distillate.

3. A process for preparing phosgene oxime which comprises reacting an aqueous solution of chloroisonitrosoacetone with chlorine gas, partially distilling the resulting solution at reduced pressure and extracting the phosgene oxime from the distillate by means of diethyl ether.

4. A process for preparing phosgene oxime which comprises reacting an aqueous solution of chloroisonitrosoacetone with chlorine, partially distilling the resulting solution at reduced pressure, extracting phosgene oxime from the distillate by means of a solvent, removing the solvent by distillation and purifying the crude phosgene oxime by fractionation.

5. A process for preparing phosgene oxime which comprises reacting an aqueous solution of chloroisonitrosoacetone with chlorine, distilling the resulting solution to yield a distillate containing phosgene oxime and a residue of unreacted chloroisonitrosoacetone, separating the unreacted chloroisonitrosoacetone by cooling the residue and filtering, adding said unreacted chloroisonitrosoacetone to an aqueous solution of chloroisonitrosoacetone to be treated with chlorine, and extracting the phosgene oxime from said distillate.

6. A process for preparing phosgene oxime which comprises reacting about one part by weight of chloroisonitrosoacetone in from about one to about twenty parts of water with from about one-fourth to about one part by weight of chlorine gas at a temperature of about 10° C. to about 50° C., partially distilling the resulting solution at reduced pressure, and extracting the phosgene oxime from the distillate with diethyl ether.

7. A process for preparing phosgene oxime which comprises reacting one part by weight of chloroisonitrosoacetone in from one to twenty parts of water with from one-fourth to one part by weight of chlorine at a temperature of 10° C. to 50° C., distilling the resulting solution at reduced pressure, and extracting the phosgene oxime from the distillate with a solvent.

8. A process for preparing phosgene oxime which comprises reacting one part by weight of chloroisonitrosoacetone in from one to twenty parts of water with from one-fourth to one part by weight of chlorine gas at a temperature of 10° C. to 50° C., distilling the resulting solution, and extracting the phosgene oxime from the distillate.

9. A process for preparing phosgene oxime which comprises reacting one part by weight of chloroisonitrosoacetone in about six parts of water with about one-half of a part by weight of chlorine gas at a temperature of 10° C. to 20° C., distilling about three-fourths or more of the resulting solution at reduced pressure, extracting the distillate with diethyl ether, drying the ether extract, removing the diethyl ether by distillation and then fractionating the crude phosgene oxime at reduced pressure, thereby producing about one-half of a part by weight of pure phosgene oxime.

10. A process for preparing phosgene oxime which comprises reacting one part by weight of chloroisonitrosoacetone in about six parts of water with about one-half of a part by weight of chlorine gas at a temperature of 10° C. to 20° C., distilling about three-fourths or more of the resulting solution at reduced pressure, extracting the distillate with a solvent, removing the solvent by distillation and then fractionating the crude phosgene oxime at reduced pressure, thereby producing about one-half of a part by weight of pure phosgene oxime.

11. A process for preparing phosgene oxime which comprises reacting one part by weight of chloroisonitrosoacetone in about six parts of water with about one-half of a part by weight of chlorine gas at a temperature of 10° C. to 20° C., distilling the resulting solution, and extracting crude phosgene oxime from the distillate.

12. A process for preparing a hydrolyzable aqueous solution of phosgene oxime which comprises reacting one part by weight of chloroisonitrosoacetone in about six parts of water with about two-thirds of a part by weight of chlorine gas at a temperature of 10° C. to 20° C. and distilling about three-fourths to nine-tenths of the resulting solution at reduced pressure, thereby producing a distillate containing phosgene oxime which can be hydrolyzed to hydroxylamine hydrochloride.

13. A process for preparing a hydrolyzable aqueous solution of phosgene oxime which comprises reacting one part by weight of chloroisonitrosoacetone in about six parts of water with about two-thirds of a part by weight of chlorine gas at a temperature of 10° C. to 20° C. and partially distilling the resulting solution at reduced pressure, thereby producing a distillate containing phosgene oxime which can be hydrolyzed to hydroxylamine hydrochloride.

14. A process for preparing phosgene oxime which comprises reacting one part by weight of chloroisonitrosoacetone in about six parts of water with about two-thirds of a part by weight of chlorine gas at a temperature of 10° C. to 20° C. and distilling the resulting solution, thereby producing a distillate containing phosgene oxime which can be hydrolyzed to hydroxylamine hydrochloride.

15. A process for preparing phosgene oxime which comprises reacting chlorine gas with the product obtained from the reaction of acetone on aqua regia, distilling the resulting solution at reduced pressure, extracting the distillate with diethyl ether, drying the ether solution, evaporating the diethyl ether and fractionating the residue at reduced pressure.

16. A process for preparing phosgene oxime which comprises reacting chlorine gas with the product obtained from the reaction of acetone on aqua regia, distilling the resulting solution at reduced pressure, extracting the distillate with a solvent, evaporating the solvent and fractionating the residue at reduced pressure.

17. A process for preparing phosgene oxime which comprises reacting chlorine gas with the product obtained from the reaction of acetone on aqua regia, distilling the resulting solution and extracting phosgene oxime from the distillate.

18. A process for preparing phosgene oxime which comprises reacting chlorine gas with the product obtained from the reaction of one part by weight of acetone on a mixture of about two parts by weight of concentrated (sp. gr. about 1.42) nitric acid and one and one-half parts by weight of concentrated (sp. gr. about 1.18) hydrochloric acid, distilling the resulting solution containing phosgene oxime at reduced pressure, extracting the distillate with a solvent, drying the extract, evaporating the extraction solvent and fractionating the residue at reduced pressure.

19. A process for preparing phosgene oxime which comprises reacting chlorine gas with the product obtained from the reaction of one part by weight of acetone on a mixture of about two parts by weight of concentrated (sp. gr. about 1.42) nitric acid and one and one-half parts by weight of concentrated (sp. gr. about 1.18) hydrochloric acid, distilling the resulting solution at reduced pressure, extracting the distillate with a solvent, evaporating the solvent and fractionating the residue at reduced pressure.

20. A process for preparing phosgene oxime which comprises reacting chlorine gas with the product obtained from the reaction of one part by weight of acetone on a mixture of about two parts by weight of concentrated nitric acid and one and one-half parts by weight of concentrated hydrochloric acid, distilling the resulting solution and extracting phosgene oxime from the distillate.

PHILIP J. EHMAN.
WALTER O. WALKER.